Jan. 4, 1966   M. H. CUNNINGHAM   3,227,424
APPARATUS FOR PRE-EXPANDING PLASTIC MATERIAL
Filed Jan. 23, 1964   7 Sheets-Sheet 2

Jan. 4, 1966   M. H. CUNNINGHAM   3,227,424
APPARATUS FOR PRE-EXPANDING PLASTIC MATERIAL
Filed Jan. 23, 1964   7 Sheets-Sheet 3

INVENTOR
Marvin H. Cunningham
BY
Wood, Herron & Evans,
ATTORNEYS.

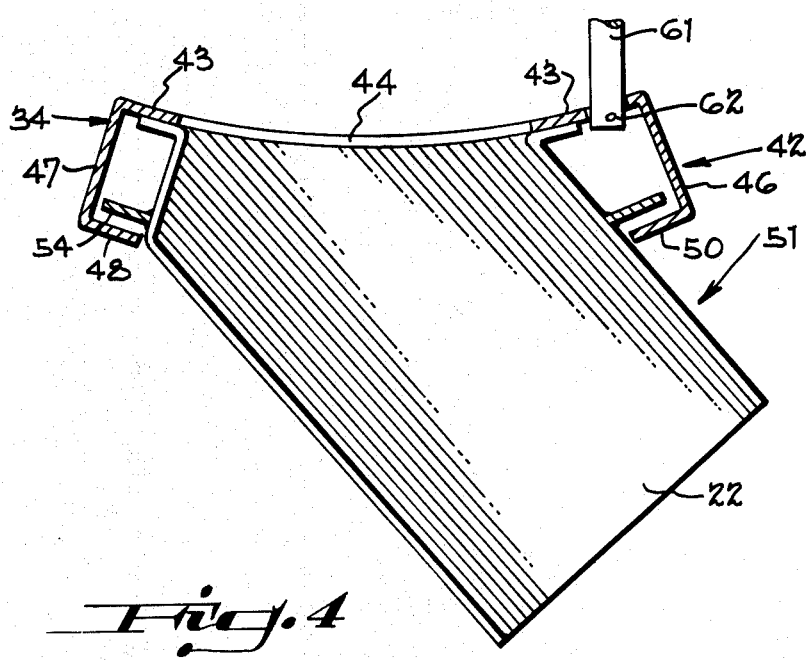
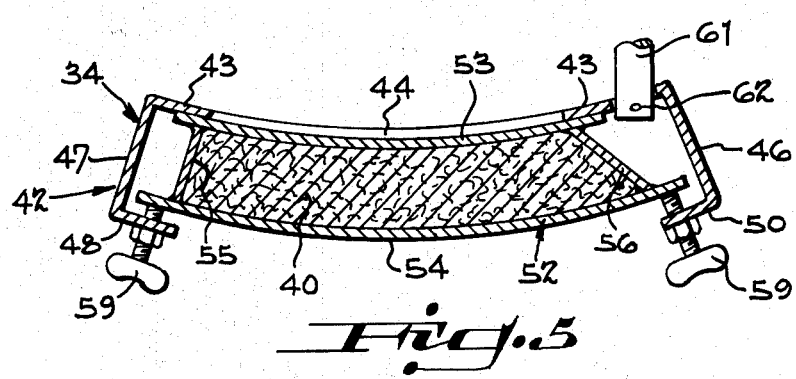

Jan. 4, 1966   M. H. CUNNINGHAM   3,227,424
APPARATUS FOR PRE-EXPANDING PLASTIC MATERIAL
Filed Jan. 23, 1964   7 Sheets-Sheet 5

INVENTOR.
Marvin H. Cunningham
BY
Wood, Herron & Evans.
ATTORNEYS.

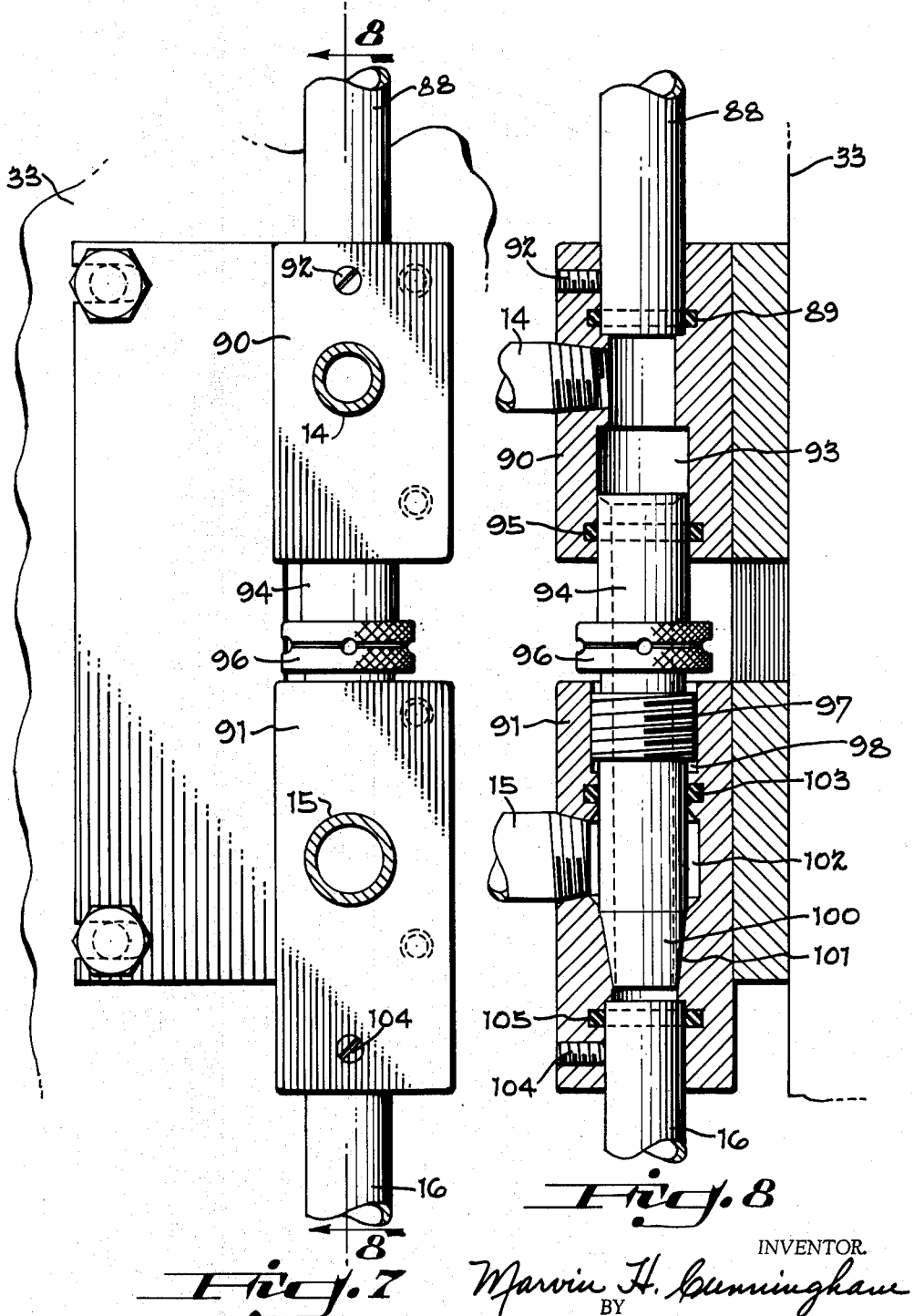

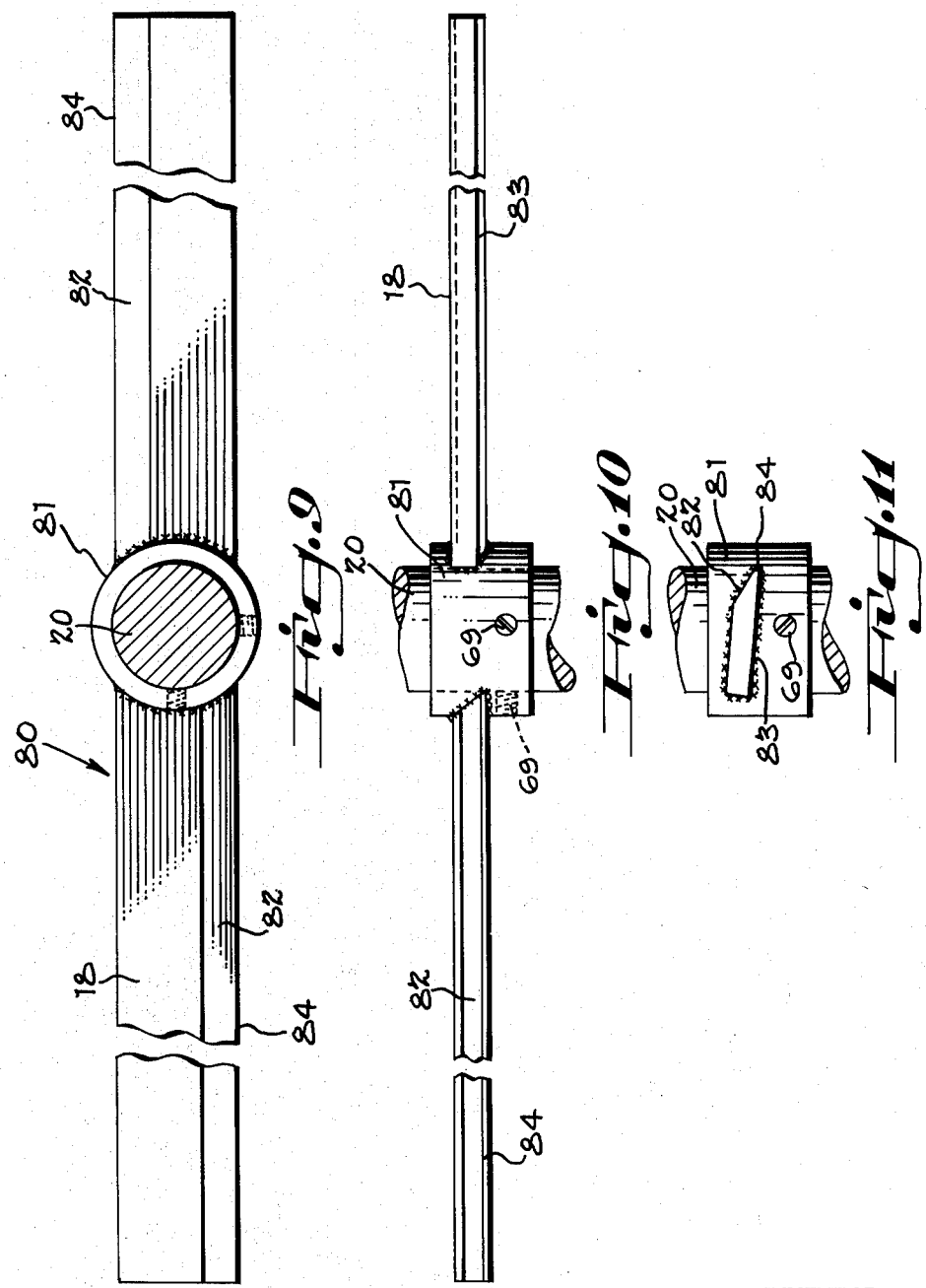

United States Patent Office 3,227,424
Patented Jan. 4, 1966

3,227,424
APPARATUS FOR PRE-EXPANDING PLASTIC MATERIAL
Marvin H. Cunningham, Lebanon, Ohio, assignor to Tri Manufacturing & Sales Co., Lebanon, Ohio, a corporation of Ohio
Filed Jan. 23, 1964, Ser. No. 339,749
8 Claims. (Cl. 259—8)

The present invention relates to apparatus for processing plastic material and is particularly directed to an improved apparatus for pre-expanding various polymeric materials in particulate form such as polystyrene foam beads or the like.

At the present time many products, such as toys, insulating layers, shipping container walls and the like, are molded from expanded polymers, such as polystyrene foam. The end products are molded using as a starting material small beads formed of a mixture of the plastic, such as polystyrene, and an expanding agent, such as petroleum ether. In the past it has been found that products of more uniform density are obtained by subjecting the beads to a pre-expansion prior to the time that they are ultimately placed into the mold and re-expanded to form an integral molded product.

It has previously been proposed to pre-expand these plastic beads in a machine comprising a cylindrical chamber housing a plurality of rotating agitator rods. Prior to the time that the beads are introduced into the machine, they are pre-mixed with air and steam. In the chamber the steam raises the temperature of the beads to a point higher than the boiling point of the expanding agent, but lower than the softening point of the polymer. The process is a continuous process so that the container is at all times filled with beads in various stages of expansion. The beads which have expanded are the lightest and tend to rise to the top where they are discharged through a chute and ultimately conveyed to a storage hopper.

One principal object of the present invention is to provide improved apparatus of this general type including novel means for controlling the density or amount of expansion of the beads discharged from the machine. Specifically, in accordance with the present invention, the degree of expansion is controlled independently of the feed rate of raw materials by controlling the residence time of the beads in the process chamber. This control is effected by providing a discharge chute which can be selectively positioned at varying elevations relative to the cylindrical processing chamber. In short, the elevation of the discharge chute controls the length of time the beads are in the processing chamber which in turn controls the amount the beads are expanded.

One advantage of this present apparatus is that it enables maximum control over the pre-expansion process even when the expandable beads are of a composition exhibiting extreme heat sensitivity. Moreover, the production rate of the beads remains substantially constant irrespective of the residence time selected.

Another important object of the present invention is to provide an improved agitator construction which also facilitates the production of more uniformly expanded beads. More particularly, the present agitator construction comprises a vertical shaft having a plurality of radially spaced horizontal blades. These blades are angulated in a transverse plane and are configurated in an "air foil" section to exert a positive lifting action on the beads, i.e. to lift the beads upwardly toward the discharge chute. This lifting action is further aided by angularly offsetting the blades from one another in a spiral-like configuration so that each blade has a maximum free area above it, consequently, each blade is effective to lift a large quantity of beads, not merely compress the beads against the undersurface of a higher blade. By virtue of this lifting action, the lighter fully expanded beads are positively urged to the top of the churning mass of beads where they are discharged through the chute. The heavier, not completely expanded beads drop downwardly and remain in contact with the steam until their pre-expansion is completed.

Another extremely important object of the present invention is to provide a pre-expander unit in which the interior of the treating chamber and agitator shafts are readily accessible for cleaning and removing of any caked material which may be formed during a faulty run or which may remain at the end of a run. In accordance with the present invention, the treating chamber is an upright cylinder and comprises a narrow load bearing frame section which supports two hinged semidrum walls. These walls are normally latched to the frame to enclose the treating chamber. However, when the apparatus is to be cleaned, the semi-drum walls are pivoted outwardly so that interior walls and the agitator blades are completely accessible.

A still further feature of the present apparatus is the provision of a novel feed and mixing apparatus for intermixing the beads with air and steam before they are introduced into the treating chamber. The present feed device includes a novel Venturi type mixing valve having a calibrated knob which facilitates a duplication of any desired operating mixture. The Venturi controls the rate at which beads are fed to the treating chamber as well as the amount of steam mixed with the beads. Once the optimum Venturi setting has been determined for a given material and desired end product, this setting can readily be duplicated by means of the calibrated knob.

These and other objects and advantages of the present invention will be more readily apparent from a consideration of the following detailed description of the drawings illustrating a preferred embodiment of the invention.

In the drawings:

FIGURE 4 is a cross sectional view taken along line 4—4 of FIGURE 3.

FIGURE 5 is a cross sectional view taken along line 5—5 of FIGURE 3.

FIGURE 7 is an elevational view of the present valve unit.

FIGURE 8 is a cross sectional view taken along line 8—8 of FIGURE 7.

FIGURE 9 is a cross sectional view taken along line 9—9 of FIGURE 3.

FIGURE 10 is an enlarged side elevational view of an agitator blade.

FIGURE 11 is an end view of an agitator blade.

Figure 1:
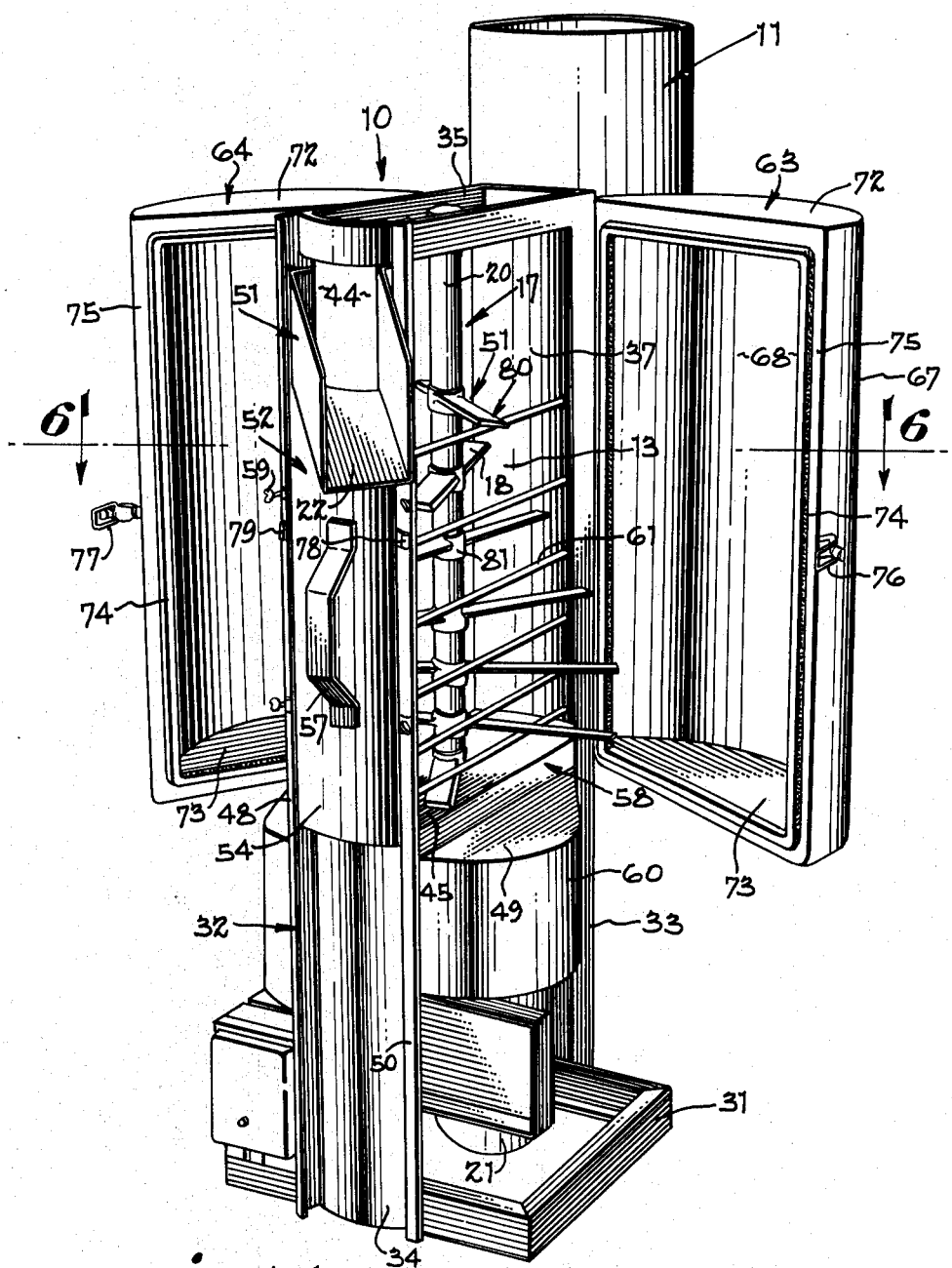
FIGURE 1 is a perspective view of a pre-expansion unit constructed in accordance with the principles of the present invention, the semi-drum side walls being shown in an open position.
Figure 2:
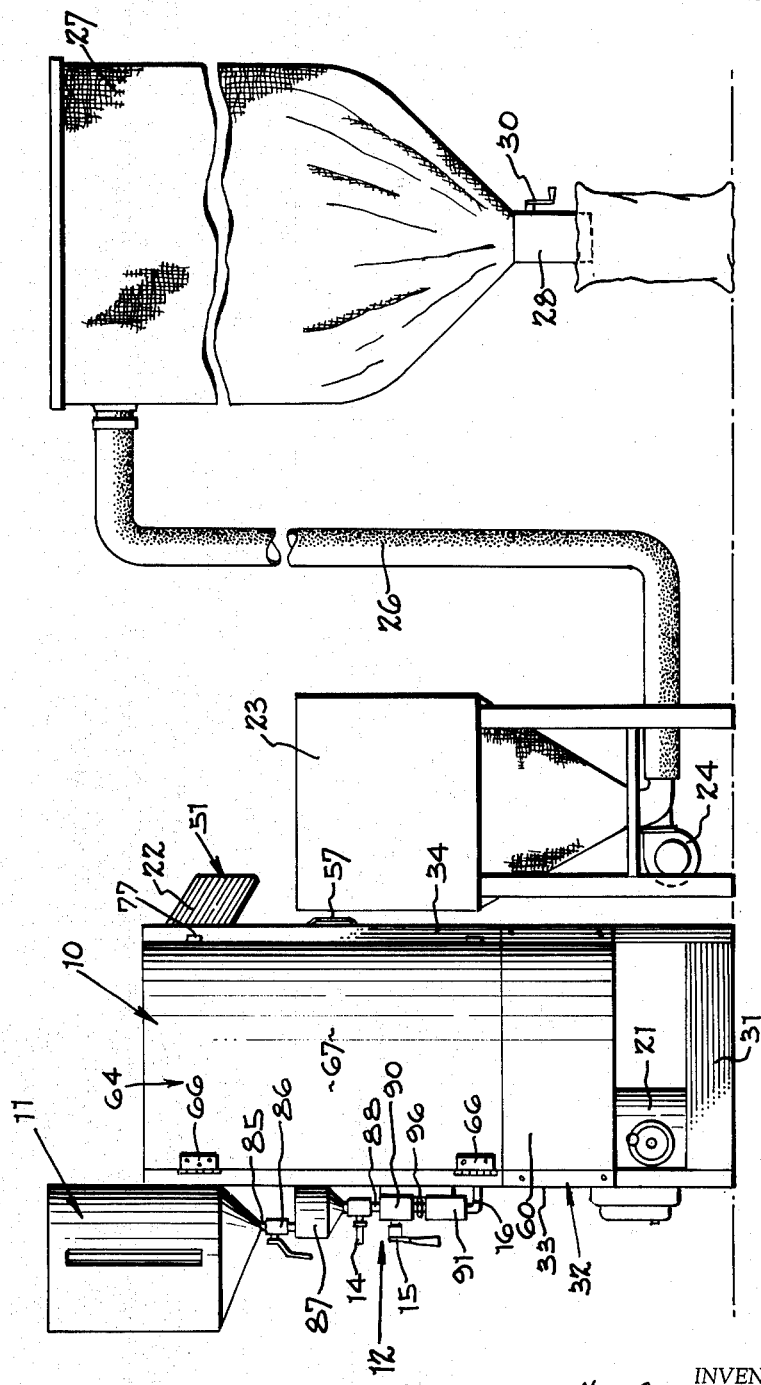
FIGURE 2 is an elevational view showing an installation including the present pre-expander apparatus.
Figure 3:
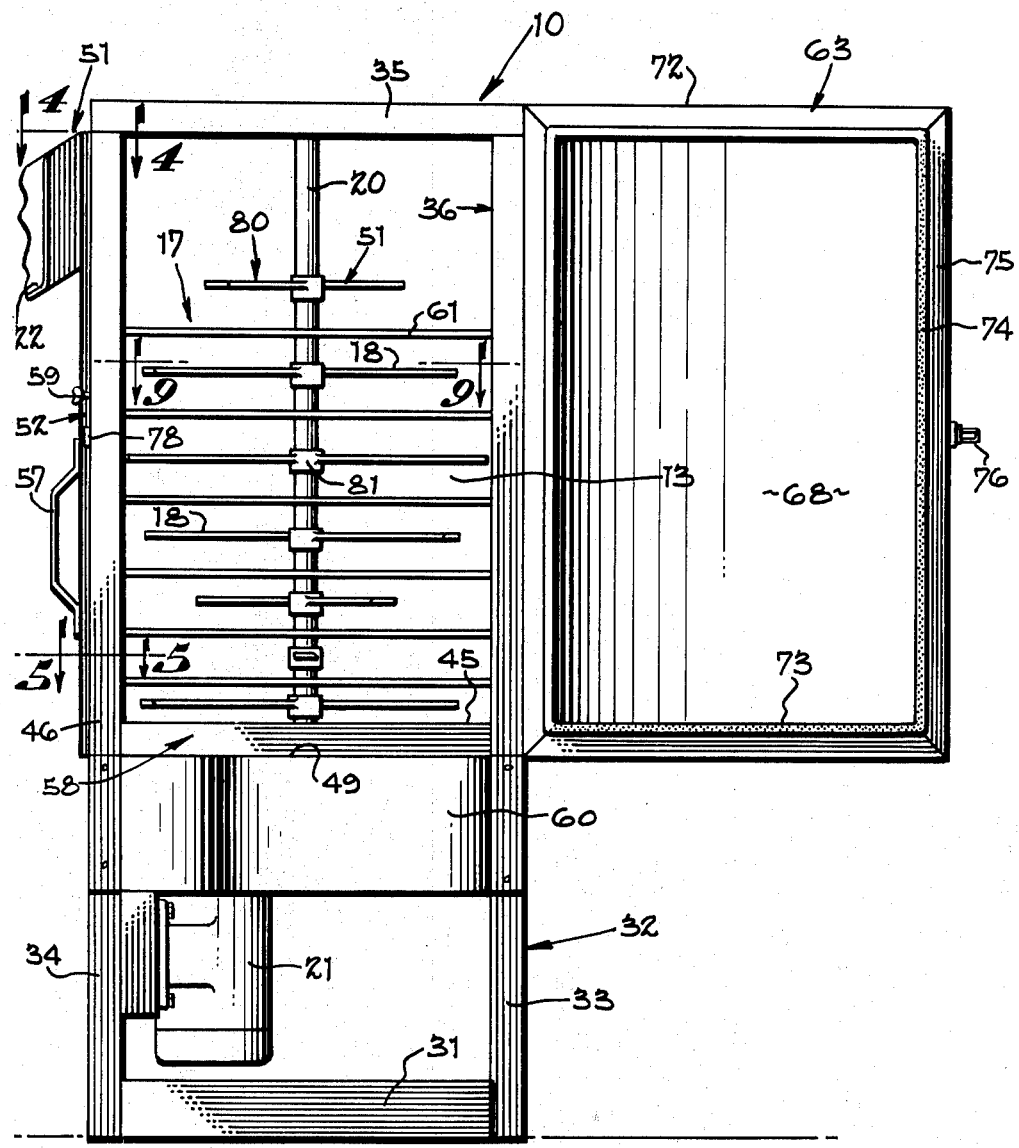
FIGURE 3 is a side elevational view of the pre-expander shown in FIGURE 1.

One preferred form of the pre-expander device embodying the principles of the present invention is shown in FIGURES 1 and 3 and one suitable installation embodying the apparatus is shown in FIGURE 2. It is to be understood that the pre-expander apparatus of the present invention constitutes an improvement over the apparatus shown in Rodman Patent No. 3,023,175 issued February 27, 1962 and the disclosure of that patent is incorporated by reference as to details such as process operating conditions and the like which are not described in detail in the present application.

As is shown in FIGURE 2 a typical installation for producing polystyrene beads includes a pre-expander unit 10 which receives expandable beads formed of polystyrene or the like from a feeder hopper 11. A Venturi type mixer device 12 interconnects feeder 11 and the cylindrical chamber 13 of the expander unit. The mixer device 12 is effective to mix beads from hopper 11 with air entering through line 14 and steam entering through line 15. This mixture is injected into the bottom portion of chamber 13 through a feed tube 16.

Cylindrical chamber 13 encloses an agitator assembly 17 which comprises a plurality of vertically spaced and angularly offset blades 18 mounted upon a vertically extending agitator shaft 20 driven from a motor 21. As is explained in detail below, blades 18 not only agitate the beads in chamber 13 but also exert a lifting action on the beads, causing the expanded beads to rise to the top of the chamber 13. A discharge chute 22 communicates with the interior of the chamber and provides means for discharging beads which have expanded the desired amount from the pre-expanded unit. Chute 22 is disposed above a hopper 23 preferably having open mesh walls to permit the steam and beads to be separated.

The expanded beads are discharged from hopper 23 by means of a blower 24 which forces beads through a line 26 to a storage chamber 27. This chamber is preferably of sufficient size to store a sizable quantity of beads and is provided with a discharge tube 28 controlled by a manually operated valve 30 so that desired quantities of beads may be withdrawn from chamber when desired. It is to be expressly understood that the installation described is merely typical of many installations in which the pre-expander apparatus may be used. By way of example, the present pre-expander unit 10 can be arranged so that its chute 22 discharges directly into a storage hopper thus eliminating the need for blower 24 and line 21, and chamber 27. The details of construction of preexpander unit 10 can best be seen from FIGURES 1, 3 and 6. As is there shown the pre-expander unit 10 comprises a rectangular base 31 formed of channel members welded or otherwise secured together. Base 31 supports a vertical box frame 32. The box frame includes vertical walls 33 and 34 which are joined at their top by a transverse top wall 35.

Vertical side wall 33 comprises a channel member 36 formed of suitable corrosion resistant material such as stainless steel or the like. The main cross web 37 of the channel defines a portion of the inner wall of chamber 13. The two parallel arms 38 of the channel member extend outwardly and support suitable thermal insulating material 40 which is held in place by a sheet metal panel 41 welded or otherwise secured to the channel member 36.

Vertical wall 34 also includes a channel member 42. The cross web 43 of channel member 42 constitutes a portion of the peripheral wall of the chamber 13. This cross web is provided with a vertical slot 44 forming a discharge opening from chamber 13. Vertical slot 44 extends from the top wall 35 to a point slightly above the bottom wall 45 of chamber 13. The two outwardly extending walls 46 and 47 of channel member 42 are provided with inwardly turned flanges 48 and 50. Channel member 42 thus functions as a guideway for chute assembly 51. Chute assembly 51 comprises discharge chute 22 and an integral insulated wall panel section 52. The insulated wall panel comprises a vertical inner wall 53 in sliding abutment with the outer surface of channel wall 43 and a spaced vertical outer wall 54. These walls are joined by end walls 55 and 56 which are respectively welded to the inner and outer walls 53 and 54. The space between the inner and outer walls is filled with a suitable insulating material.

Chute assembly 51 is vertically movable within channel 52 to provide a selective adjustment for the height of the discharge chute 22. When the assembly is positioned as shown in FIGURE 1 the chute is disposed in its uppermost position. The portion of the slot 44 beneath the chute is closed by inner wall 53 of the chute assembly. The chute assembly is readily shifted from one position to another by means of a handle 57 welded to outer wall 54. Once the chute has been positioned, it is held in place by means of set screws 59 which threadably engage flanges 48 and 50 and abut outer wall 54 of the chute assembly.

Wall members 33 and 34 are further tied together by means of a transverse channel member 58. This channel member is welded or otherwise secured to vertical channel members 36 and 42 and forms part of bottom wall 45 extending across chamber 13. A transverse cover panel 49 is disposed beneath channel member 58. The cover panel 49 is provided with a depending peripheral skirt 60. The cover panel and skirt are mounted in any suitable manner such as by means of bolts secured to channel member 58 and to the side arms of the vertical channel members.

The vertical side walls also carry a plurality of transverse rods 61. These rods extend horizontally in parallel spaced relationship to one another. The rods are disposed parallel to but are offset from a diameter of the chamber 13 to provide clearance for agitator shaft 20. Each of the rods 61 extends outwardly through aligned openings in walls 37 and 43 of channel members 36 and 42, the rods being held in place by any suitable means such as pins 62.

Figure 6:
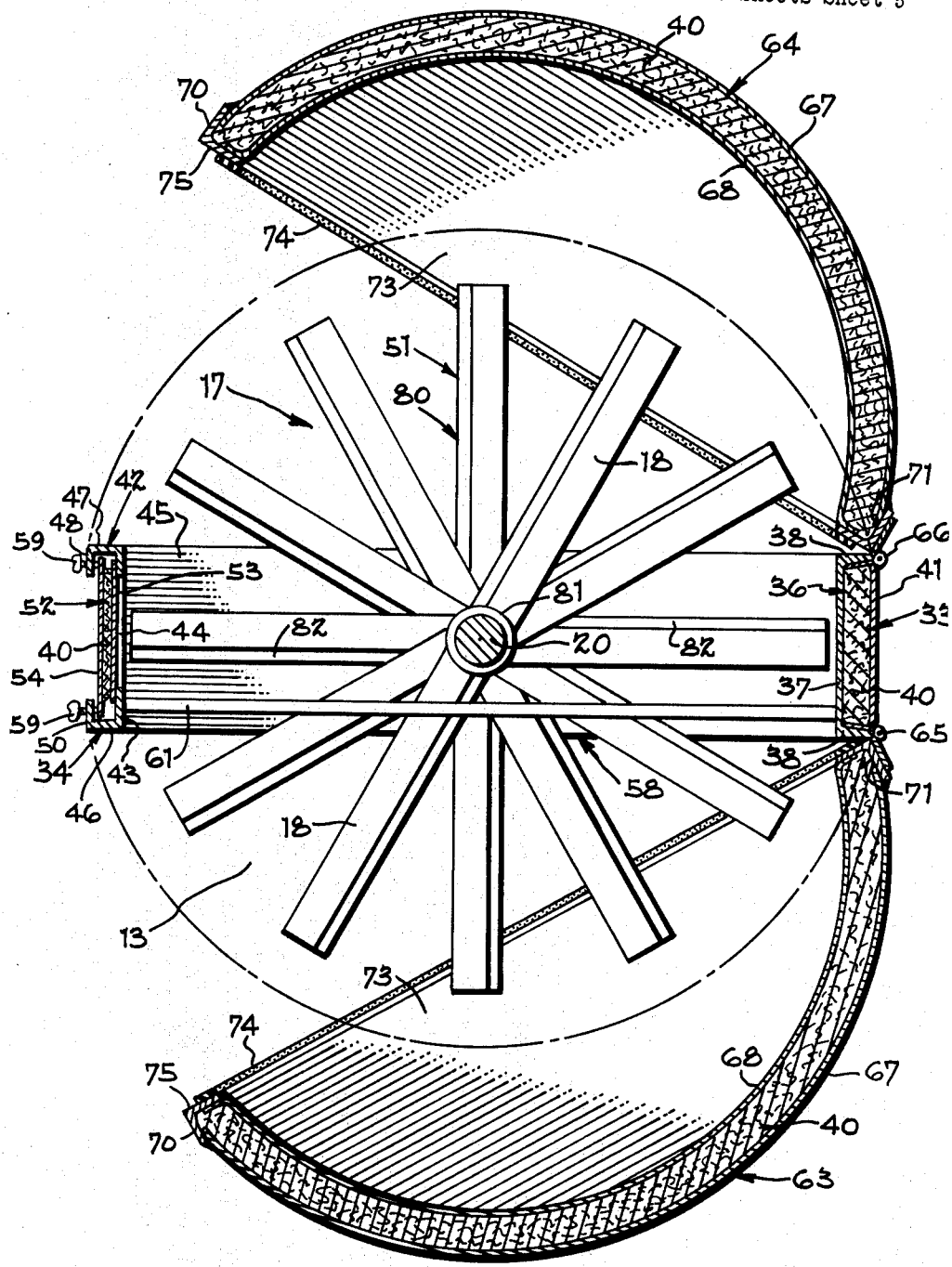
FIGURE 6 is a cross sectional view taken along line 6—6 of FIGURE 1.

The pre-expander unit 10 further comprises two semidrum side walls 63 and 64. As shown in FIGURES 1 and 6 these walls are hinged to channel member 36 as by means of loose pin butt hinges 65 and 66. Each of the semi-drum walls comprises an arcuate outer wall 67 and an arcuate inner wall 68. The inner wall 68 and outer wall 67 are preferably concentric with the axis of agitator shaft 20. The inner wall 68 forms part of the vertical wall of chamber 13. Inner and outer walls 67 and 68 are held in spaced relationship by means of angle members 70 and 71 to which the walls are welded. The space between the walls is filled with a suitable thermal insulating material.

The semi-drum side members 63 and 64 also include top and bottom wall sections 72 and 73. These sections are positioned to form continuations of top wall 35 and bottom wall 45. It is to be understood that each of the top and bottom sections 72 and 73 are double walled and are provided with insulation in the same manner as the peripheral walls of the semi-drum members. A gasket 74 surrounds the inner surface 75 of the semi-drum members and is adapted to be compressed in sealing engagement between the inner surface 75 and the adjacent portions of vertical walls 33, 34, top wall 35 and bottom wall 45.

As is shown in FIGURES 1 and 6 the semi-drum side walls can be rotated to an open position providing ready access to the entire interior of the pre-expander unit. When the unit is in operation the semi-drum walls 63 and 64 are held in their closed position as by means of quick opening latches 76 and 77. The latches are carried by the outer walls 68 of the drum members and are positioned to cooperate with stationary keepers 78 and 79 mounted on vertical side wall 34.

Agitator shaft 20 is mounted for rotation about a vertical axis concentric with the center of chamber 13. The lowermost end of the shaft 20 passes downwardly through channel member 58 and is journalled in a stationary bearing (not shown). This end of the shaft is interconnected by a suitable drive such as a belt drive (not shown) to the output of a gear reduction unit connected to motor 21. Since the elements of this drive are conventional, it is not considered necessary to describe their construction in detail. The upper end of shaft 20 is rotatably journalled in a bearing carried by upper wall 35.

Agitator shaft 20 carries a plurality of spaced rotors 80. As is best shown in FIGURES 9–11, each rotor comprises a center cylindrical hub 81 adapted to receive shaft 20 and to be secured on shaft 20 by means of a set screw 69. Each hub is welded to two horizontal, diametrically opposed blades 18. Each of the blades 18 has a bevelled leading edge 82. The leading edge 82 does not extend completely to the bottom surface 83 of the blade but rather is joined thereto by a short generally vertical edge 84 having a height for example of the order of 1/8". Thus, there is no knife edge formed on the blades which might tend to cut beads within chamber 13.

As is particularly shown in FIGURE 11, the blades are slightly angulated with respect to horizontal when viewed in a transverse plane. Specifically the front edge of the blade is depressed a small amount for example five degrees from a horizontal plane. As is best shown in FIGURES 1 and 6, the blades are also angularly offset from one another. While the exact degree of offset is not critical, I have found it advantageous to offset each blade by approximately 30 degrees from the blade above and below. The blades are offset from one another in a spiral fashion so that there is a maximum clear space above each blade.

The configuration of the blades and transverse angulation in combination with the staggered relationship enables the blades to exert an optimum agitating action on the beads within chamber 13. Specifically, the blades are effective to impart a lifting or vertical movement to the beads which tends to direct the beads upwardly toward the discharge chute rather than merely in a circular path. The lighter expanded beads remain in this upper position and are discharged from the chute while the unexpanded more dense beads sink back toward the bottom of the chamber for further processing.

The mechanism for feeding beads to chamber 13 is best shown in FIGURES 1, 7 and 8. As there shown a hopper 11 is mounted in any suitable manner upon side wall 33. This hopper is effective to store a quantity of unexpanded beads which are discharged from the hopper into a tube 85. The rate at which the beads are discharged downwardly through tube 85 is controlled by means of a suitable manually operated valve 86 such as a gate valve or the like. Beads are discharged from this gate valve into a funnel member 87 which is in turn connected to feed tube 88. Feed tube 88 is joined to the mixer unit 12. This unit comprises an upper block 90 and a lower block 91.

Block 90 is provided with a vertical bore for receiving the end of tube 88. Tube 88 is held in place by means of set screw 92 and the joint between the tube and block being sealed by means of an O-ring 89. Air line 14 is threaded in the block 90 and communicates with the vertical bore 93 in the block. The lower end of bore 93 is provided with an enlarged portion which slidably received the upper end of a hollow stem member 94. An O-ring 95 provides a seal between the stem member and block. Stem member 94 carries a knurled adjustment knob 96 disposed between blocks 90 and 91. The stem includes an enlarged threaded section 97 which threadably engages a bore 98 formed in block 91; and a tapered end section 100. This tapered end section cooperates with a tapered section 101 of bore 98. Steam is introduced into bore 98 from line 15, the steam entering an annular enlarged section 102 of the bore and being trapped from upward escape by means of an O-ring 103. The discharge end of bore 98 is connected to feed tube 16, the tube being inserted in the bore and being held in place by means of set screw 104 with an O-ring 105 providing a seal between the feed tube 16 and block 91.

In operation a quantity of expandable beads is placed in feed tube 16. Venturi stem 94 is adjusted by rotating knob 96. It is to be understood that in the preferred embodiment knob 96 has numbers disposed about its periphery which cooperate with a stationary reference mark formed on housing 90. These numbers enable the operator to quickly and easily duplicate the desired operation conditions. As stem 94 is rotated, it increases or decreases the spacing between the tapered wall of the stem and the tapered wall 101 of bore 98. This in turn alters the amount of steam admitted to bore 98 and the degree of vacuum created in the venturi. The degree of vacuum also affects the rate at which beads are drawn from tube 88 and mixed with the air and steam.

The mixture of air, steam and beads are fed through tube 16 to the lower portion of cylinder 13. The beads within this chamber are heated and expanded. At the same time the beads are agitated by blades 18 so that agglomeration of the beads is prevented. The blades are also effective to lift the beads upwardly toward the discharge chute 22. It will be appreciated that the expanded beads are lighter than unexpanded beads. Consequently the expanded beads remain at the top of the chamber and are discharged from chute 22. It will further be appreciated that the amount of expansion of the beads is dependent upon the length of time the beads remain in contact with steam in chamber 13. In the present pre-expander unit this time is readily controlled independently of the feed rate by rasing or lowering chute 22. The chute is held in the vertical position providing the desired residence time by means of set screws 59.

In the event that it becomes necessary to clean the machine the semi-drum walls 63 and 64 are released by actuating latches 76. The two semi-drum side walls are then pivoted outwardly so that the entire interior walls of chamber 13, shaft 20, and agitator blades 18 are readily accessible for cleaning.

From the above disclosure of the general principles of the present invention and foregoing description of a preferred embodiment of the invention, those skilled in the art will readily comprehend various modifications to which the invention is susceptible. Therefore I desire to be limited only by the scope of the following claims.

Having described my invention, I claim:

1. In apparatus for pre-expanding polymeric particulate material, said apparatus comprising a chamber, inlet means for introducing a mixture of polymeric particulate material, steam and air adjacent to the lower portion of said chamber, and a rotatable agitator assembly disposed within said chamber said polymeric particulate material forming beads which expand and rise within said chamber, the improvement which comprises a discharge chute for discharging polymeric particulate material from the upper portion of said material within said chamber after said material has undergone a predetermined expansion, and means for mounting said discharge chute at any of a plurality of heights relative to the bottom of said chamber, the height of said chute controlling the residence time of said material in said chamber independently of the feed rate thereof.

2. In apparatus for pre-expanding polymeric particulate material, said apparatus comprising a load bearing frame including two vertical walls and a top wall, a pair of semi-drum arcuate side walls, means hingedly mounting said semi-drum walls to a vertical wall of said frame, and means releasably latching said semi-drum walls to said frame, said semi-drum walls and frame defining an upright cylindrical chamber, inlet means for introducing a mixture of particulate polymeric material, steam and air into said chamber, and discharge means disposed above said inlet means.

3. In apparatus for pre-expanding polymeric particulate material, said apparatus comprising a load bearing frame including two vertical walls, an intermediate transverse wall and a top wall, a pair of semi-drum arcuate side walls, means hingedly mounting said semi-drum walls to one vertical wall of said frame, and means releasably latching said semi-drum walls to said frame, said semi-drum walls, top wall and intermediate wall defining an upright cylindrical chamber, inlet means carried by said frame for introducing a mixture of polymeric particulate material, steam and air into said chamber, discharge means carried by said frame and disposed above said inlet means.

4. In apparatus for pre-expanding polymeric particulate material, said apparatus comprising a load bearing frame including two vertical walls, an intermediate transverse wall and a top wall, a pair of semi-drum arcuate side walls, means hingedly mounting said semi-drum side walls to one vertical wall of said frame, and means releasably latching said semi-drum walls to said frame, said semi-drum walls, top wall and intermediate wall defining an upright cylindrical chamber, inlet means carried by said frame for introducing a mixture of polymeric particulate material, steam and air into said chamber, discharge means carried by said frame and disposed above said inlet means, an agitator assembly disposed within said chamber, said agitator assembly comprising a vertical shaft and a plurality of horizontal agitator blades, means carried by said top wall and said transverse intermediate wall for rotatably journalling said shaft.

5. In apparatus for pre-expanding polymeric particulate material, said apparatus comprising a frame including two vertical walls and a top wall, at least one of said vertical walls being of channel configuration and including a cross web and outwardly extending parallel arms, a vertical slot formed in the cross web of said channel member, a chute assembly supported by said channel member, said chute assembly comprising a chute adapted for registry with a portion of said slot, and a wall section disposed below said chute and integral therewith, and means carried by said channel for mounting said chute assembly in position with the wall covering a preselected portion of said slot.

6. In apparatus for pre-expanding polymeric particulate material, said apparatus comprising a frame including two vertical walls and a top wall, at least one of said vertical walls being of channel configuration and including a cross web outwardly extending parallel arms, a vertical slot formed in the cross web of said channel member, a chute assembly supported by said channel member, said chute assembly comprising a chute adapted for registry with a portion of said slot, and a wall section disposed below said chute and integral therewith, and means carried by said channel for mounting said chute assembly in position with the wall covering a preselected portion of said slot, said last named means comprising flanges formed on the parallel arms of said channel, and screw means threadably engaging said flanges and abutting said chute assembly.

7. In apparatus for pre-expanding polymeric particulate material, said apparatus comprising a frame including two vertical walls and a top wall, at least one of said vertical walls being of channel configuration and including a cross web and outwardly extending parallel arms, a vertical slot formed in the cross web of said channel member, a chute assembly supported by said channel member, said chute assembly comprising a chute adapted for registry with a portion of said slot, and a wall section disposed below said chute and integral therewith, and means carried by said channel for mounting said chute assembly in position with the wall covering a preselected portion of said slot; said last named means comprising flanges formed on the parallel arms of said channel, and screw means threadably engaging said flanges and abutting said chute assembly, a pair of semi-drum arcuate side walls, means hingedly mounting said semi-drum walls to said frame, whereby said semi-drum walls and frame define an upright cylindrical chamber, inlet means for introducing a mixture of polymeric particulate material, steam and air into said chamber.

8. In apparatus for pre-expanding polymeric particulate material, said apparatus comprising an upright cylindrical chamber, inlet means for introducing a mixture of polymeric particulate material, steam and air adjacent to the lower portion of said chamber, said polymeric particulate material forming beads which expand and rise within said chamber, and a discharge chute for discharging material from the upper portion of said material within said chamber at a point spaced above the inlet means, the improvement which comprises an agitator assembly disposed within said cylindrical chamber, said agitator assembly comprising a vertical shaft, means rotatably mounting said shaft on an axis concentric with the axis of said cylindrical chamber, a plurality of blades extending radially outwardly from said agitator, said blades being vertically spaced from one another, said blades being configurated to impart a lifting motion to said polymeric particulate material and means for selectively spacing said chute above said inlet means, the height of said chute being effective to control the resonance time of material in said chamber independently of the feed rate thereof.

References Cited by the Examiner

UNITED STATES PATENTS

| | | | |
|---|---|---|---|
| 2,735,591 | 5/1956 | Branchflower | 222—405 |
| 2,884,234 | 4/1959 | Gebhart et al. | 259—107 |
| 2,887,305 | 5/1959 | Ginneken | 259—8 |
| 3,023,175 | 2/1962 | Rodman | 259—8 |
| 3,090,606 | 5/1963 | Burnet | 259—9 |

WALTER A. SCHEEL, *Primary Examiner.*

CHARLES A. WILLMUTH, *Examiner.*

ROBERT W. JENKINS, *Assistant Examiner.*